(12) United States Patent
Rudnicki

(10) Patent No.: US 7,658,222 B2
(45) Date of Patent: Feb. 9, 2010

(54) HEATING A STORAGE BUILDING

(76) Inventor: Michael Rudnicki, 1550 Dawson Road, Thunder Bay (CA) P7G 2E5

( * ) Notice: Subject to any disclaimer, the term of this patent is extended or adjusted under 35 U.S.C. 154(b) by 748 days.

(21) Appl. No.: 11/405,691

(22) Filed: Apr. 18, 2006

(65) Prior Publication Data
US 2007/0240847 A1    Oct. 18, 2007

(51) Int. Cl.
  F24J 3/08    (2006.01)
  F25B 29/00   (2006.01)
(52) U.S. Cl. .......................... 165/45; 165/47
(58) Field of Classification Search .......... 165/45, 165/47, 48.1, 53
See application file for complete search history.

(56) References Cited
U.S. PATENT DOCUMENTS

| | | | | |
|---|---|---|---|---|
| 3,451,553 A | * | 6/1969 | Davis | 210/170.08 |
| 3,658,123 A | * | 4/1972 | Root | 165/207 |
| 3,986,344 A | | 10/1976 | Newman | |
| 4,008,709 A | * | 2/1977 | Jardine | 126/610 |
| 4,184,856 A | * | 1/1980 | Thoren | 165/45 |
| 5,534,147 A | * | 7/1996 | Kallenbach et al. | 210/605 |
| 5,730,208 A | * | 3/1998 | Barban | 165/45 |
| 2006/0242983 A1 | * | 11/2006 | Spadafora et al. | 62/260 |

* cited by examiner

Primary Examiner—Tho v Duong
(74) Attorney, Agent, or Firm—Adrian D. Battison

(57) ABSTRACT

A storage building such as a garage of a residential house is heated to a low temperature above freezing but below that suitable for human habitation by connecting a closed loop pipe and a pump so as to pump heat transfer liquid through a portion of the pipe embedded in a cast concrete lid of a septic tank and through another portion of the pipe embedded in a cast concrete floor of the building. The simple system avoids use of a complex heat pump by using the limited heat available from the septic tank to directly heat the garage floor to a low temperature but above freezing.

9 Claims, 1 Drawing Sheet

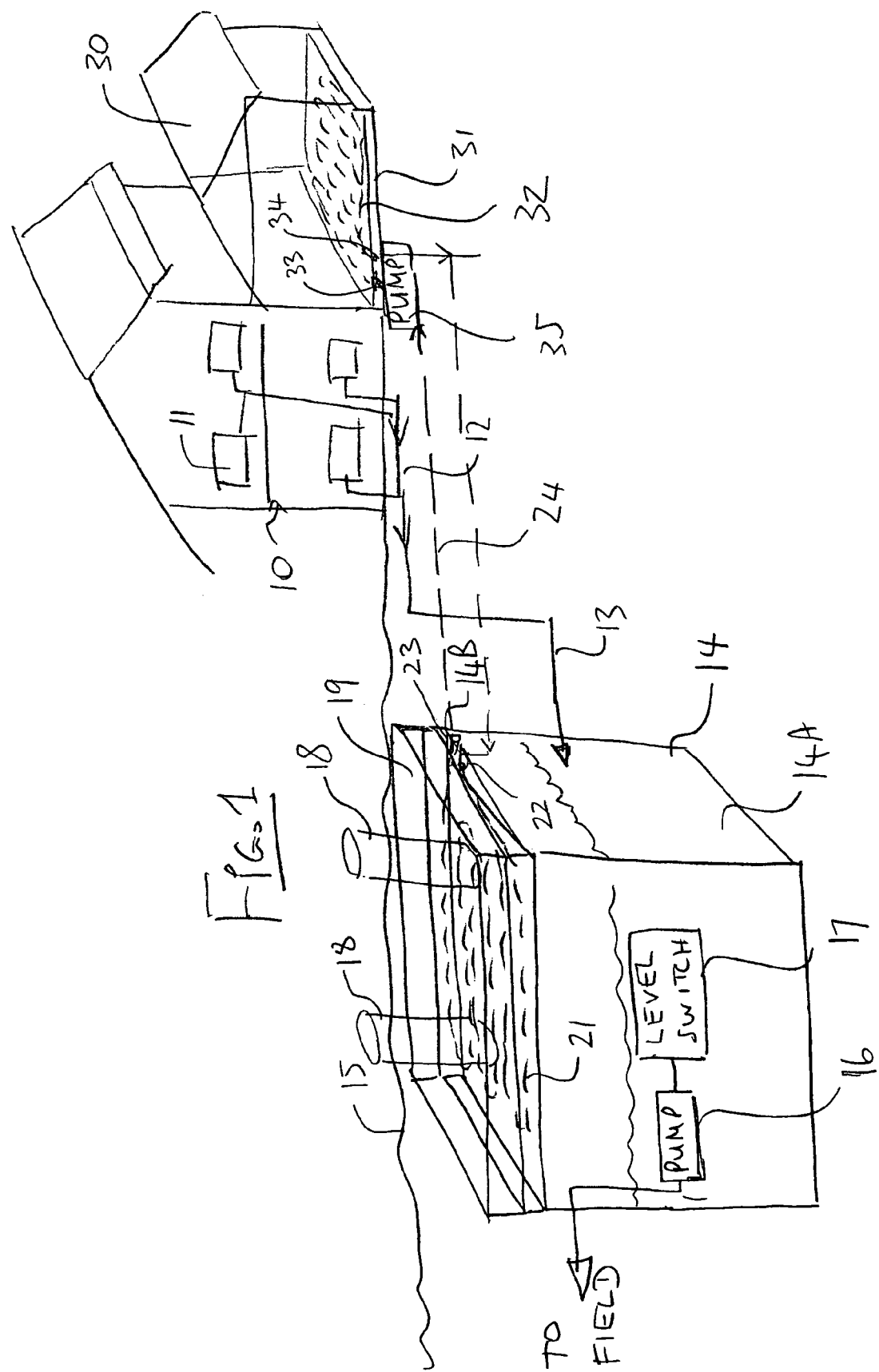

HEATING A STORAGE BUILDING

This invention relates to a method of heating a building, a septic tank for use in heating a building and to a kit of parts for heating a building.

BACKGROUND OF THE INVENTION

It is previously known that a septic system of a building such as a residential home contains residual heat which has the potential to be extracted and used to heat the building.

The septic system collects liquid waste material from the building and stores this within a tank where anaerobic bacterial activity acts upon the waste material to break down solids. The anaerobic bacterial activity generates heat and also heat is added to the system from warm water used within the building.

Previous attempts to extract heat from the septic system have generally used heat pumps where a pipe circulates water under the ground into the septic system in a closed loop where an inner end of the pipe acts as an input into a heat pump which transfers heat from the circulating water to a heated side of the heat pump to transfer that heat into a furnace of the building.

Such heat pump systems are not generally popular and have not achieved widespread acceptance partly due to the complexity and partly due to inefficiencies in the system which do not provide the expected economies.

One example is shown in U.S. Pat. No. 3,986,344 (Newman) issued Oct. 19, 1976 where the circulating water is passed through a pipe which is wrapped around the outside of the tank and within the area of the septic system where the waste liquid is discharged from the tank. This system has not achieved widespread acceptance.

Another factor which must be taken into account is that the septic system requires a certain temperature for the anaerobic activity to occur so that it is not possible to operate a system which extracts sufficient heat from the septic system to interfere with this bacterial activity.

SUMMARY OF THE INVENTION

It is one object of the invention to provide a.

According to one aspect of the invention there is provided a method of heating comprising:

providing a building;

providing a portion of the building arranged to act as a storage location;

providing a plumbing system for the building including a waste material drain system from draining liquid waste material from the building;

providing a septic tank arranged to receive the liquid waste material within which anaerobic bacterial activity occurs to breakdown the liquid waste material;

and maintaining the portion of the building at a temperature above Zero degrees Celsius (freezing) and below twenty degrees Celsius by providing a heat transfer system for transferring heat from the septic tank to the portion of the building;

the heat transfer system including a pipe containing a heat transfer liquid and a pump for transferring the heat transfer liquid through the pipe as a closed loop;

arranging a portion of the pipe in contact with the septic tank to extract heat therefrom and a portion of the pipe in the building so that heat extracted into the heat transfer liquid from the septic tank escapes from the pipe directly into the portion of the building so as to heat the portion of the building to a temperature no greater than the temperature of the heat transfer liquid;

and maintaining a temperature of the liquid waste material within the septic tank above an operating temperature at which the anaerobic bacterial activity occurs by arranging the portion of the pipe in contact with the septic tank to extract heat from an upper part of the septic tank above the waste material so as to avoid extracting sufficient heat from the liquid waste material in the tank to cause the anaerobic bacterial activity to halt.

Preferably the portion of the pipe in the portion of the building is located within a floor of the portion of the building.

Preferably the floor is cast concrete with the pipe embedded therein.

Preferably the portion of the pipe in contact with the septic tank is embedded within a material from which the septic tank is formed.

Preferably the septic tank is formed from cast concrete with the pipe embedded therein.

Preferably the portion of the pipe in contact with the septic tank is located within a separate cover lid of the septic tank. In this way, the extraction of heat is restricted to heat rising from the liquid waste material without significantly cooling the material itself. Thus the heat extraction removes only heat which would normally be lost to the soil or environment surrounding the tank and does not affect the operation of the septic system.

Thus the present inventor has realized that sufficient heat can be extracted from the septic tank without affecting the operation of the tank while that heat can be effectively used by transferring it to a floor of a building which is heated to a useful temperature albeit a temperature which is less than would be acceptable for human habitation.

The portion of the building may be a garage or other similar building commonly used for storage since the temperature achievable is less than that suitable for human habitation and is generally less than 15 degrees Celsius and in most cases less than 10 degrees Celsius.

Preferably an insulating layer is applied over an upper part of the septic tank to as to reduce heat loss from the upper part.

According to a second aspect of the invention there is provided a septic tank comprising:

a hollow body formed from a molded material defining a wall surrounding the hollow body to define a hollow interior;

the hollow body being arranged to be buried within the ground and to receive within the hollow interior a liquid waste material from a building for anaerobic bacterial activity to occur to breakdown the liquid waste material;

and a pipe embedded within the material from which the septic tank is molded, the pipe having an inlet end and an outlet end exposed beyond the hollow body for connection of the pipe of a pump for transmission of a heat transfer liquid through the wall of the hollow body to extract heat therefrom.

According to a third aspect of the invention there is provided a kit of parts for heating a building comprising:

a septic tank comprising:

a hollow body formed from a molded material defining a wall surrounding the hollow body to define a hollow interior;

the hollow body being arranged to be buried within the ground and to receive within the hollow interior a liquid waste material from a building for anaerobic bacterial activity to occur to breakdown the liquid waste material;

and a pipe embedded within the material from which the septic tank is molded, the pipe having an inlet end and an outlet end exposed beyond the hollow body;

a pump for transferring a heat transfer liquid through the pipe as a closed loop;

and a portion of pipe arranged for laying in a floor of a building got be heated such that a portion of the pipe in contact with the septic tank is arranged to extract heat therefrom and a portion of the pipe in the floor of the building is arranged so that heat extracted into the heat transfer liquid from the septic tank escapes from the pipe directly into the building so as to heat the building to a temperature no greater than the temperature of the heat transfer liquid.

BRIEF DESCRIPTION OF THE DRAWINGS

One embodiment of the invention will now be described in conjunction with the accompanying drawings in which:

FIG. 1 is a schematic illustration of a heating system according to the present invention.

In the drawings like characters of reference indicate corresponding parts in the different FIGURES.

DETAILED DESCRIPTION

The present invention is based upon the realization of the inventor that sufficient heat can be extracted from an upper part of a septic tank to supply sufficient heat to a storage building such as a garage so as to maintain the garage at a temperature above freezing using a simple direct transfer method in which liquid is passed through a closed loop from a septic tank to a garage. The inventor has realized that this can be achieved while providing a sufficient temperature increase within the storage building to maintain at a useful temperature at the order of 10° C. without reducing the temperature within the septic tank to a level which will interfere with the bacterial activity.

The system does not use complex heat pumps and does therefore not attempt to extract large amounts of heat from the septic system in a manner which will cause unacceptable cooling of the septic system. The temperature of the septic system at the upper level and generally within the lid or cover of the septic system is sufficiently high even in very low temperatures significantly below freezing to allow transfer of that heat to the storage building in a manner which will provide satisfactory heating of the storage building.

Of course the storage building cannot be heated by additional heating systems to a temperature sufficient for human habitation such as a temperature above 20° C. since then the simple heat transfer loop would act to transfer heat from the storage building back to the septic system.

The present invention is particularly applicable in climates where the exterior temperature is commonly well below freezing at least at night and sometimes during the day so that it is desirable to heat a storage building sufficiently to maintain it constantly above freezing.

The arrangement is particularly applicable to concrete septic tanks where the simple heat transfer pipe can be cast within the body of the cast concrete material in an upper level of the tank. It is particularly applicable that the pipe be applied into a cover or lid of the tank since this element is generally cast as a separate element to be placed onto an open top of a cast lower portion of the tank. When the loop is confined to the lid, the lid can be formed as a separate element to be applied onto existing tank structures either as a retrofit or simply as an additional element to be applied onto new tanks where the base of the tank remains unchanged.

In FIG. 1 is shown schematically a septic system from a building 10 which has a series of plumbing fixtures 11 in the interior of the building which supply waste material generally in liquid but containing some solids through a drainage system 12 and an exterior pipe 13 into an interior of the tank 14. The tank is located closely adjacent the building below the ground level indicated at 15.

In some cases the tank includes an extraction pump 16 which is controlled by a level switch 17 so that the level is maintained between limits and the extra liquid above the upper limit is pumped from the tank to a septic field.

Other systems which can be used with the present invention simply use gravity to discharge liquid from the upper level without the necessity for a pump where the field is located at a height below the upper level of the liquid within the tank.

The present invention is also applicable to septic storage tanks where the liquid is maintained within the tank and periodically pumped from the tank for transportation to a discharge location.

The tank shown in FIG. 1 comprises a base portion 14A and a rectangular flat lid 14B placed over an open top of the hollow lower portion 14A. The lid conventionally includes a lip which locates the lid on the base portion of the tank covering the base portion with suitable sealing arrangements to prevent penetration. One or more access ducts 18 are located above the lid so that a lower end of the access duct connects with a hole in the lid and the duct extends from the lid upwardly to an upper end which is located above ground level. This provides access to the interior of the tank for pumping and for other maintenance activities.

On top of the lid is provided an optional insulation layer 19 which extends over the top of the cover or lid and thus reduces heat loss from the top surface of the lid into the soil above the lid. The insulation layer may extend beyond the periphery of the lid so as to further prevent heat rising in the soil around the lid.

The lid is modified relative to conventional lids of this type by the provision of a loop of pipe 21 which passes through the lid in a back and forth convoluted manner so as to ensure that the loop is in conduction distance from the material of the lid so that heat can be extracted from the full area of the lid. The loop has two outlet openings 22 and 23 at one edge of the lid with a plumbing connector at the outlet openings for connection to a further pipe 24.

Adjacent the house or building 10 is provided a storage building 30 which is generally a garage but may contain other storage materials. The garage has a cast concrete floor 31 which has also a pipe 32 embedded within the concrete floor and extending from the first connection 33 at one edge of the floor to a second connection 34 at the edge of the floor. The pipe 24 is connected between the outlets 22 and 23 at the lid and the outlets 33 and 34 at the garage floor and a pump 35 is provided in the system so as to form a closed loop in the pipe or tube which extends from the lid to the floor.

There is no heat transfer system in the loop apart from the heat transfer liquid which passes through the closed loop between the floor and the lid. Thus heat extracted from the lid is simply transferred to the floor with the action of maintaining the lid and the floor generally at an approximate equal temperature.

The present inventor has found that a conventional garage floor having an area of the order of 500 square feet. can be maintained at a temperature of the order of 10° utilizing the heat extracted from a conventional septic tank suitable for a similar residence. This temperature can be maintained even at very low exterior temperatures down to −40° C. This temperature can be maintained without causing a reduction of the temperature within the septic tank to a temperature which would interfere with the bacterial activity.

Typically the cross sectional area of a septic tank lid of this type will be of the order of 50 to 250 square feet. The heat that is extracted from the lid is that heat which would normally simply rise within the soil and cause heating of the soil above the septic tank. There is little or no effect of transferring cool from the lid downwardly into the tank. The lid is not reduced to a temperature below freezing since the lid is maintained at a temperature approximately equal to the temperature of the floor with the intention that both of these elements are maintained above freezing.

It has been found that a suitable flow rate which can be readily determined by simple experimentation by a person skilled in the art is sufficient to maintain the lid and the floor approximately at equal temperatures so as to avoid affecting the action within the septic tank while maintaining the floor well above freezing with sufficient heat being transferred to the floor to ensure that the air within the storage building is also maintained above freezing.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of heating comprising:
   providing a building;
   providing a portion of the building arranged to act as a storage location;
   providing a plumbing system for the building including a waste material drain system for draining liquid waste material from the building;
   providing a septic tank arranged to receive the liquid waste material within which anaerobic bacterial activity occurs to breakdown the liquid waste material;
   and maintaining the portion of the building at a temperature above Zero degrees Celsius (freezing) and below twenty degrees Celsius by providing a heat transfer system for transferring heat from the septic tank to the portion of the building;
   the heat transfer system including a pipe containing a heat transfer liquid and a pump for transferring the heat transfer liquid through the pipe as a closed loop;
   arranging a portion of the pipe in contact with the septic tank to extract heat therefrom and a portion of the pipe in the building so that heat extracted into the heat transfer liquid from the septic tank escapes from the pipe directly into the portion of the building so as to heat the portion of the building to a temperature no greater than the temperature of the heat transfer liquid;
   and maintaining a temperature of the liquid waste material within the septic tank above an operating temperature at which the anaerobic bacterial activity occurs by arranging the portion of the pipe in contact with the septic tank to extract heat from an upper part of the septic tank above the waste material so as to avoid extracting sufficient heat from the liquid waste material in the tank to cause the anaerobic bacterial activity to halt.

2. The method according to claim 1 wherein the portion of the pipe in the portion of the building is located within a floor of the portion of the building.

3. The method according to claim 2 wherein the floor is cast concrete with the pipe embedded therein.

4. The method according to claim 1 wherein the portion of the pipe in contact with the septic tank is embedded within a material from which the septic tank is formed.

5. The method according to claim 4 wherein the septic tank is formed from cast concrete with the pipe embedded therein.

6. The method according to claim 5 wherein the portion of the pipe in contact with the septic tank is located within a separate cover lid of the septic tank.

7. The method according to claim 1 wherein the portion of the building is a garage.

8. The method according to claim 5 wherein the portion of the building is heated to a temperature less than 15 degrees Celsius.

9. The method according to claim 1 wherein an insulating layer is applied over an upper part of the septic tank to as to reduce heat loss from the upper part.

* * * * *